United States Patent Office 3,123,135
Patented Mar. 3, 1964

3,123,135
WATER FLOODING OF CLAY CONTAINING RESERVOIRS
George G. Bernard and Orrin C. Holbrook, Crystal Lake, Ill., assignors to The Pure Oil Company, Chicago, Ill., a corporation of Ohio
No Drawing. Filed Sept. 12, 1960, Ser. No. 55,116
3 Claims. (Cl. 166—9)

This invention relates to the recovery of petroleum from subterranean reservoirs, and is more particularly concerned with a water-flooding method for the recovery of petroleum in greater amounts than is possible by conventional techniques. This invention is especially directed to an improved water-flooding composition for treating clay-containing formations.

This invention is concerned only with those petroleum-containing reservoirs that also contain substantial quantities of water-sensitive clays. Generally, water-sensitive clays are considered to be detrimental to water flooding, because they tend to swell, disperse, or otherwise respond to the presence of fresh water in a manner to render the formation less permeable. It is well known that oil-containing formations containing water-sensitive clays, especially montmorillonite, illites, and kaolinites undergo a marked decrease in permeability when flooded with fresh water. This decrease in permeability is often sufficient to reduce injection rates at practical pressures to a value so low that water-flooding operations must be abandoned. In the presence of such clays in petroleum-bearing formations, it becomes a very difficult problem to maintain adequate injection rates of fresh water for efficiently water flooding the reservoir.

It has become common practice in the petroleum industry to flood water-sensitive clay-containing reservoirs with brine solutions so as to maintain a higher permeability. The prior art also teaches the use of various chemical compositions which act as clay-stabilizing agents to prevent loss of permeability upon contact with fresh water. Exemplary of such agents are those disclosed by Brown et al., U.S. Patent 2,761,841; and Shock et al., U.S. Patent 2,839,466. These and other prior art references teach that by the use of sufficient concentrations of salt or other agents, the permeability of water-sensitive formations can be maintained at substantially their initial value during flooding operations.

Various water-sensitive clays respond upon contact with fresh water with varying degrees of severity. Different formations are known to contain varying proportions of water-sensitive constituents. As herein used, water-sensitive clay-containing formations are defined to include those formations which upon contact with distilled water undergo a decrease in permeability to water of greater than 50% of the initial formation permeability to water. While the prior art teaches the desirability of maintaining the permeability of such formations at substantially the initial formation permeability, it has been discovered that greater quantities of oil can be recovered by adjusting the flood water to contain a concentration of clay-stabilizing constituents such that the formation permeability is maintained in the range of 0.1 to 0.5 of the initial formation permeability before contact with water.

It is an object of this invention to provide an improved method for water flooding water-sensitive clay-containing formations whereby the formation permeability to oil is maintained at a critical level within which oil recoveries are enhanced.

In accordance with this invention, water-sensitive clay-containing formations are flooded with water which has been treated to maintain the formation permeability within the range of about 0.1 to 0.5 times the initial formation permeability. The water is treated by adjusting the content of an agent capable of maintaining formation permeability by stabilizing the formation clay content. The most widely used clay-stabilizing material is salt, but other stabilizing agents, such as those named in the aforementioned patents may also be used.

The increase in oil recovery which may be expected by employing the method of this invention has been demonstrated in an experiment in which a core was flooded with batches of water of varying salt content. The core, which consisted of sandstone containing a small amount of sodium montmorillonite, was initially saturated with brine containing approximately 10% sodium chloride. The core was then driven to residual brine saturation by flooding with oil. The initial core saturation was 67.3% oil and 32.7% water. Five experiments were performed on the core in sequence, the flood rate being maintained constant at 16 feet per day throughout the five experiments. The results of these experiments are set out in Table I.

Table I

| Expt. | Percent NaCl in Floodwater | Residual Oil Saturation | Pressure Drop, p.s.i./inch |
|---|---|---|---|
| 1 | 10 | 36.4 | 0.4 |
| 2 | 1 | 36.4 | 0.5 |
| 3 | 0.5 | 30.2 | 4.5 |
| 4 | 0.1 | 26.4 | 12.0 |
| 5 | 0.0 | 24.0 | 50.0 |

In each experiment the core was flooded with a sufficient quantity of floodwater of the designated sodium chloride concentration to reduce the core to residual oil saturation. At residual oil saturation the core comes into equilibrium such that as additional quantities of floodwater are injected, no additional oil is recovered. Thus continuous injection of floodwater containing the same concentration of sodium chloride could be continued indefinitely without affecting the core, once this equilibrium has been established. When floodwaters containing lesser quantities of sodium chloride were injected, additional quantities of oil were recovered until the core again reached equilibrium with the injected fluid, the oil content of the core again being reduced to residual oil saturation. The pressure-drop figures reported are the equilibrium pressure drops occurring at residual oil saturation. It is evident that by flooding cores containing water-sensitive clay with substantially fresh water, higher oil recoveries can be expected. The use of fresh water, however, must be avoided, since it results in a dramatic reduction in core permeability which prevents the injection of water into the core at reasonable pressures. It is evident, however, that by adjusting the floodwater to maintain the core permeability within the range of about 0.1 to 0.5 of the initial permeability, enhanced oil recoveries can be obtained without decreasnig the core permeability too drastically.

The amount of clay-stabilizing agent to be employed must be determined by core experiments performed upon rock specimens obtained from the formation to be flooded. The exact amount of agent to be added to the floodwater will depend upon the initial permeability of the core, the amount and nature of the water-sensitive clay in the core, the rate of advance of the flood to be carried out, and the pressure capacity of the injection equipment.

In determining the practicality of flooding a reservoir which has been depleted by primary production methods, core samples are commonly obtained for performing tests to determine porosity, permeability, water and oil saturation, etc. In the practice of this invention, tests on core samples are also made to determine the quantity of clay-stabilizing agent which must be added to the floodwater to maintain the core permeabilities within the range of 0.1 to 0.5 of the initial permeability. The tests also indicate the pressure drop which can be expected in the formation, and the oil recoveries which can be expected. Where the clay-stabilizing agent is sodium chloride, a plurality of cores may be employed and each core may be flooded with a batch of water having a specified sodium chloride content. By observing the oil recoveries and the permeabilities of these cores, the amount of sodium chloride which must be added to the water in flooding the reservoir can be determined. Alternatively, the same core may be flooded with a sufficient quantity of brine to reduce the core oil content to residual oil saturation for the particular brine concentration employed. The core is treated in sequence with a plurality of floodwaters having selected salt concentrations. The floodwater should be injected in sequence beginning with the higher concentration and ending with the lower concentration. Where clay-containing formations are to be stabilized with clay-stabilizing additives other than salt, it is preferred that the tests be made on a plurality of cores, each core being used for a single determination. In this instance, each core may be flooded with an identical quantity of water; however, it is preferred that each core be flooded to residual oil saturation.

As a specific example of the method of this invention, five cores are obtained from a formation to be waterflooded. Each of the five cores is flooded with water having a specific concentration of sodium chloride differing from the concentrations employed in the flooding of the other four cores. Each core is flooded to residual oil saturation. The results obtained from these tests are as follows:

Table II

| Test | Recovery, Percent of Oil in Place | Percent NaCl in Floodwater | Permeability, md. |
|---|---|---|---|
| 1 | 30 | 10 | 150 |
| 2 | 30 | 5 | 150 |
| 3 | 32 | 1 | 120 |
| 4 | 40 | 0.5 | 50 |
| 5 | 43 | 0.1 | 7 |

It is evident from an inspection of Table II that as the concentration of sodium chloride in the floodwater is diminished, the oil recovery from the core increases. It is further observed that when a sodium chloride concentration of 0.5% by weight is employed, the permeability of the core decreases to a value of about 0.33 of the initial core permeability, the initial core permeability being about the permeability to the highly concentrated brine solution employed in Test 1. Accordingly, the formation to be flooded is produced by injecting through an input well and into the formation floodwater containing about 0.5% by weight of sodium chloride. Oil is recovered in a conventional manner from a producing well.

Water-sensitive clay-containing formations, once contacted by fresh water, cannot be restored to their initial permeability by injection of brine. Restoring the permeability of such formations, once it has been decreased, is difficult and necessarily expensive. Therefore, it is important not to inject fresh water or water containing too little clay-stabilizing agent before flooding in accordance with this invention.

The embodiments of the invention in which an exclusive property or privilege is claimed are defined as follows:

1. In the recovery of oil from underground reservoirs containing oil and water-sensitive clay by the injection of floodwater through an injection well into the formation and the production of oil from a producing well, the improvement comprising adjusting the concentration of a clay-stabilizing constituent in said floodwater to maintain the permeability of the formation thereby contacted within the range of 0.1 to 0.5 of the initial permeability thereof.

2. A method in accordance with claim 1 in which core samples obtained from said reservoir are flooded with batches of water containing varying concentrations of clay-stabilizing agent to determine a concentration of said agent capable of maintaining the permeability of said core in the range of 0.1 to 0.5 of the initial permeability thereof, and then flooding said formation with water containing about said determined concentration of said agent.

3. A method in accordance with claim 2 in which said agent is chiefly sodium chloride.

References Cited in the file of this patent

UNITED STATES PATENTS

| | | |
|---|---|---|
| 2,738,325 | Rydell | Mar. 13, 1956 |
| 2,841,222 | Smith | July 1, 1958 |
| 2,941,597 | O'Brien | June 21, 1960 |